United States Patent [19]

Schenk, Jr.

[11] 4,011,364
[45] Mar. 8, 1977

[54] NON-REVERSIBLE BATTERY COVER

[75] Inventor: Raymond L. Schenk, Jr., Doylestown, Pa.

[73] Assignee: Gould Inc., Rolling Meadows, Ill.

[22] Filed: Oct. 1, 1975

[21] Appl. No.: 618,500

[52] U.S. Cl. .................................. 429/1; 429/176
[51] Int. Cl.² .......................................... H01M 2/04
[58] Field of Search ................ 136/176, 170, 168; 429/1, 176

[56] References Cited
UNITED STATES PATENTS

| | | | |
|---|---|---|---|
| 2,000,199 | 5/1935 | Stanley | 136/176 |
| 2,999,893 | 9/1961 | Casserly | 136/176 |
| 3,544,754 | 12/1970 | Buttke et al. | 136/176 |
| 3,622,396 | 11/1971 | Fernandez | 136/176 |

*Primary Examiner*—Donald L. Walton
*Attorney, Agent, or Firm*—Leydig, Voit, Osann, Mayer & Holt, Ltd.

[57] ABSTRACT

A battery cover arrangement for a battery having symmetrically disposed posts of opposite polarity including abutments on at least some of the posts and opposing projections on the underside of the cover which prevent the posts from fully extending through apertures in the cover when the cover is mis-oriented with respect to the polarity of the posts and polarity indicia on the cover.

5 Claims, 7 Drawing Figures

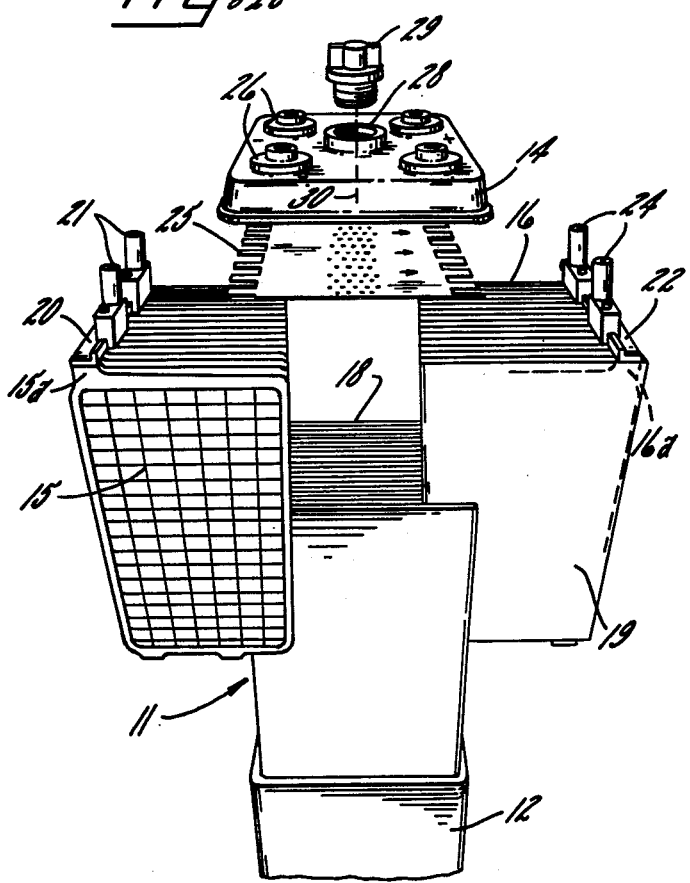
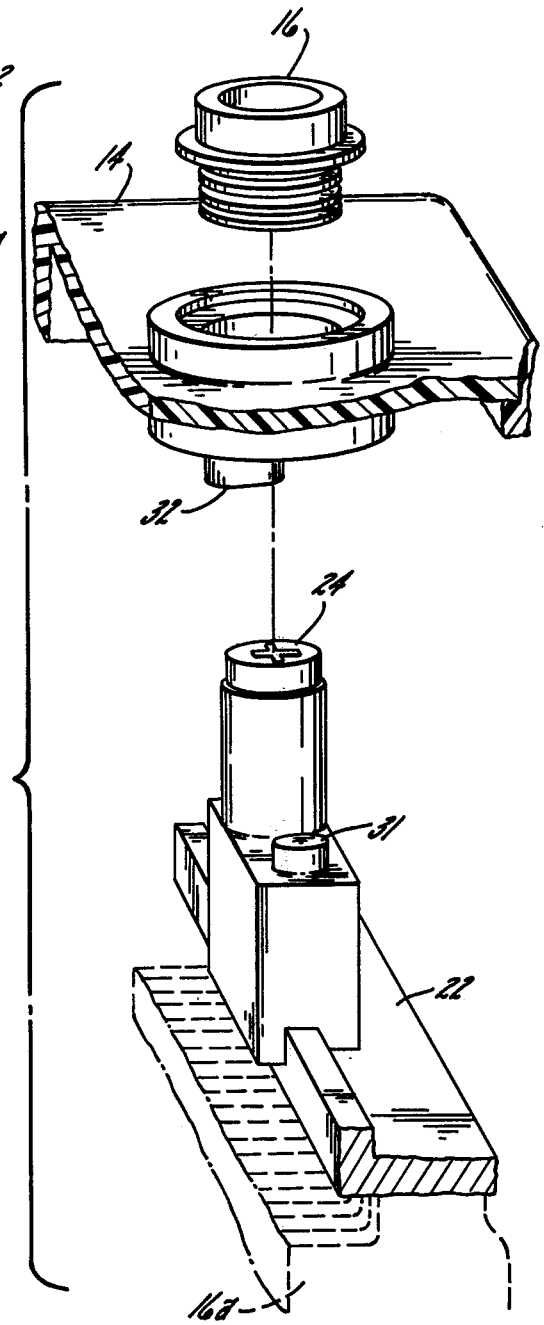
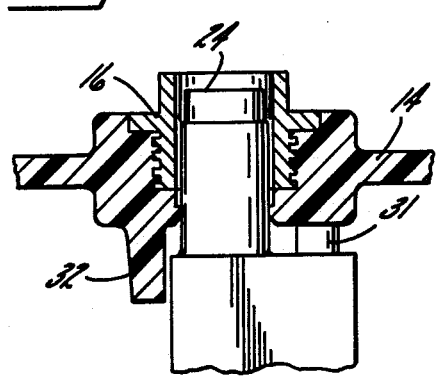

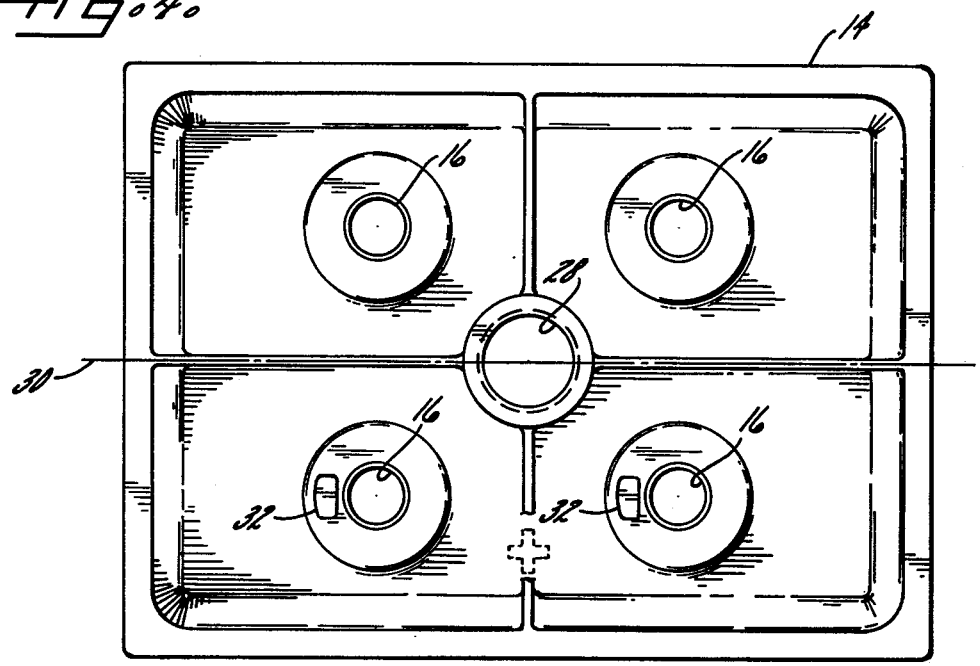
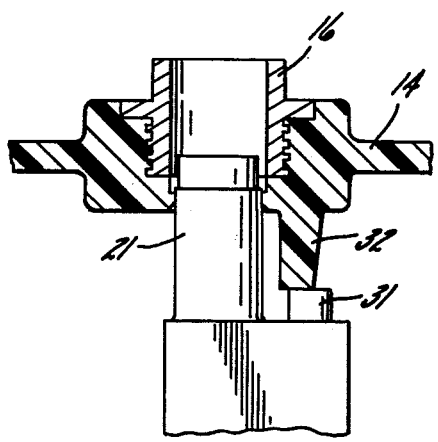
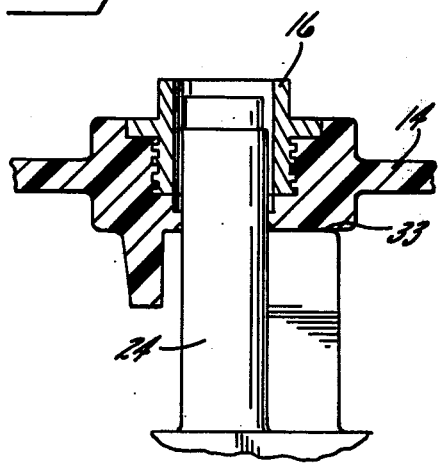
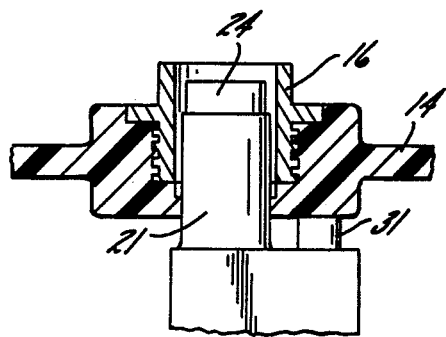

NON-REVERSIBLE BATTERY COVER

This invention relates generally to electric storage batteries and more particularly concerns a non-reversible cover for such batteries.

Secondary storage batteries, particularly the larger so-called industrial types, are often contained in box-like cases or jars defining open topped cells which are closed by covers fitted to the tops of the cells and sealed by flooding at least the edges of the cover with a settable sealing compound. One arrangement of this type is shown in copending Hayes et al. application Ser. No. 549,991, filed Feb. 14, 1975 for Battery Cell Cover Assembly, now U.S. Pat. No. 3,957,539. It is also typical for the cover to include polarity indicating indicia so that the cells may be properly connected to form batteries and so the customer can subsequently properly identify the positive and negative posts. However, since the posts are generally disposed symmetrically in the cell, there is a danger that the cover may be mis-oriented and sealed on the cell with the polarity indicia adjacent the post of the wrong polarity.

Accordingly, it is the primary aim of the present invention to provide a battery cover arrangement which prevents mis-orientation of the cover with respect to the polarity of the posts and polarity indicia on the cover.

It is a more detailed object to provide such a cover arrangement which causes the cover to noticeably misfit the posts when mis-oriented with respect to polarity. An even more specific object is to cause the cover to tilt when it is mis-oriented.

These and other objects and advantages of the invention will become apparent upon reading the following detailed description and upon reference to the drawings, in which:

FIG. 1 is an exploded perspective view of an industrial battery cell with a non-reversible cover arrangement of the present invention;

FIG. 2 is an enlarged fragmentary exploded perspective view of one of the battery posts, a cover bushing and a portion of the cover of the present invention;

FIG. 3 is a fragmentary vertical cross-section of one battery post, cover bushing and a portion of the cover shown in proper orientation;

FIG. 4 is a plan view of the underside of the non-reversible cover of the present invention;

FIGS. 5 and 6 are fragmentary sections, similar to FIG. 3, illustrating opposite portions of the cover when mis-oriented; and, FIG. 7 is a fragmentary section similar to FIG. 3, illustrating a modification of the present invention.

While the invention will be described in connection with certain preferred embodiments and procedures, it will be understood that I do not intend to limit the invention to those specific embodiments and procedures. On the contrary, I intend to cover all alternatives, modifications and equivalents as may be included within the spirit and scope of the invention as defined by the appended claims.

Turning now to the drawings, there is shown in FIG. 1 a conventional battery cell 11 depicted in partially exploded form so as to expose most of the various battery components contained therein. Such components include a cell casing 12, commonly called a jar, and cover 14, both of which have heretofore conventionally been formed of high impact rubber but which could also be made of plastic material such as polystyrene. Contained within the cell casing 12 are a group of negative plates 15, a group of positive plates 16, and a group of separators 18. The negative plates 15 and positive plates 16 of the exemplary cell 11 comprise cast lead grids into which selected chemical pastes, or active materials, are inserted. After the pastes have been applied to the respective grids, the grids are dried. The positive plates 16 are normally wrapped with fiberglass or the like (not shown) to insure retention of the active materials, and each positive plate is then inserted into a plastic protective envelope, as best indicated at 19. The separators 18 are preferably formed of microporous rubber which is temperature and acid resistant, and are generally flat on the side adjacent the negative plate and grooved on the side adjacent a positive plate. Such separators 18 serve as insulators between the interleaved positive and negative plates, although they are sufficiently porous to permit free passage of electrolyte therethrough.

After casting of the positive and negative plates, application of the active materials thereto, drying, and wrapping of the positive plates, positive and negative groups or assemblies of plates are formed, commonly by welding the lug portions 15a, 16a of the plates to battery straps and/or battery posts. As here shown, the negative plate lugs 15a are welded to a battery strap 20 integral with a pair of vertically upstanding, negative battery posts 21, while the positive plate lugs 16a are welded to a similar battery strap 22 integral with a pair of vertically upstanding positive battery posts 24. The thus assembled negative and positive plate groups are then interleaved with one another, there being a separator 18 between each positive and negative plate, and the entire assembly is inserted into the cell casing or jar 12 on top of a sediment bridge (not shown). A protective element 25, which may be made of plastic, is placed on top of the plate assembly so as to prevent: foreign materials from entering the cell; damage to the internal cell components by careless use of hydrometers or thermometers; and, mass shorts between the positive and negative plates. The high impact rubber cover 14 is then positioned on top of the jar or casing 12, with the posts 21 and 24 passing through lead bushings 26 molded in place in the cover, and the cover is secured to the jar by means of a hot, pliable, asphalt based compound. Normally at this stage of the assembly operation, the battery posts 21, 24 are bonded to the respective bushing inserts 26 by a hand-burning or hand-torching technique. Alternatively, the battery posts 21, 24 may be bonded to the bushing inserts 26 by positive displacement bonding as disclosed in my copending application Ser. No. 435,178 filed Jan. 21, 1974, now U.S. Pat. No. 3,909,301. Electrolyte is then added to the battery cell through a fill opening 28 adapted to be closed by a screw-threaded cap 29, and the cell is then repetitively charged and discharged to assure proper capacity and quality.

Once the cells 11 have been assembled, charged and inspected, they are then ready to be assembled in various configurations to provide a complete battery to meet specific requirements of a customer or ultimate user. In such assembly, multiple cells are inserted into a steel battery casing (not shown) and interconnected in accordance with the requirements and specifications of the customer or user. As disclosed in my above-mentioned copending application, such interconnections commonly entail the use of lead intercell connectors which bridge the space between battery posts of opposite polarity in adjacent cells —i.e., the positive posts of one cell are coupled to the negative posts of an adjacent cell. Each intercell connector is designed so that one end thereof sits on and surrounds a bushing 26 associated with a negative post 21, while the opposite end thereof sits on and surrounds a bushing 26 associated with a positive post 24. A workman then bonds the connector to the post/bushing combination by a conventional hand-burning technique, or by the positive displacement bonding technique disclosed in my above-mentioned application.

When the battery posts 21, 24 are initially formed, they typically are provided with polarity indicia at their ends. Thus, the negative posts 21 carry a minus sign (−) and the positive posts 24 carry a plus sign (+) as may be clearly shown in FIG. 2. However, when the posts 21, 24 are bonded to their respective bushings 26, the polarity indicia at the ends of the posts is generally obliterated by the molten lead which forms the bond. For this reason the cover 14 is also provided with polarity indicia in the form of plus (+) and minus (−) signs adjacent the respective bushings 26 through which the positive and negative posts 24, 21 are adapted to fit.

It is also customary for the battery posts 21, 24 to be symmetrically disposed within the cell casing 12 and the openings formed by the bushings 26 in the cover 14 to likewise be symmetrically disposed relative to the center line 30 of the cover. This symmetrical arrangement of posts 21, 24 and bushings 26 is typical whether the cell 11 includes a plurality of posts 21, 24 of opposite polarity (two positive and two negative posts being shown) or only one positive and one negative post. Thus, if care is not exercised when the cover 14 is installed on the cell 11 and sealed to the case 12 the cover indicia may be, and sometimes is, mis-oriented with respect to the polarity of the posts 21, 24. At best this requires unsealing and removing the cover 14 from the case which frequently results in damage or destruction of the cover, and at worst, destruction of the cell 11 (and possibly others) if the positive and negative posts are misconnected in a battery array and charged with current.

In accordance with the present invention, a non-reversible cover arrangement is provided including abutment means 31 adjacent at least the posts of one polarity and opposing means 32 on the underside of the cover 14 to prevent the posts from extending fully through the bushings 26 when the cover is mis-oriented with respect to the polarity of the posts 21, 24. As shown in FIGS. 1, 2 and 3, the abutment means 31 is in the form of boss formed integrally with but eccentric to the battery posts 21, 24. Referring now to FIGS. 3, 4 and 5, the opposing means 32 on the underside of the cover 14 is in the form of a projection formed integrally with the cover 14 but eccentric to the bushings 26 on one side of the center line 30 of the cover, for example, on the side with the plus sign (+). Thus, when the cover 14 is mis-oriented, i.e., with the bushings 16 on the positive side of the cover 14 positioned over the negative posts 21, the projections 32 strike the abutments 31 and prevent the posts 21 from fully entering the bushings 16. When the cover is properly oriented so that the cover indicia is located adjacent posts of like polarity, the projections 32 are disposed on the opposite side of the posts 24 from the abutments 31 and the posts 24 extend into the bushings 16 the desired amount which is governed by the boss 31 striking the underside of the cover 14 surrounding the bushing 16.

Pursuant to the preferred embodiment of the invention, projections 32 are located on only one side of the center line of the cover 14, although locating abutments 31 are formed on both the positive and negative posts 24, 21. Thus, when the cover 14 is mis-oriented with respect to polarity, one set of the posts 21, 24 extends fully into the bushings 16 (see FIG. 6) while the other posts 21, 24 do not (see FIG. 5), resulting in the cover 14 having a noticeable tilt relative to the casing 12. This provides added assurance that the cover 14 will not simply be sealed to the case 12 in a raised, mis-oriented position.

Referring to FIG. 7, there is shown a post 24 with a modified abutment in the form of a shoulder 33 extending radially from the post 24. It will also be appreciated that the abutments adjacent the posts and the projections adjacent the bushings may also be provided with other shapes without departing from the present invention.

I claim as my invention:

1. A non-reversible cover arrangement for a battery having a casing and at least two symmetrically disposed terminal posts of opposite polarity comprising, in combination, a cover adapted to fit and close said casing and having polarity designating indicia on one side of the center line thereof, said cover having apertures therethrough disposed symmetrically for receiving said terminal posts when said cover is properly oriented so that said indicia is located adjacent said posts of like polarity, and means including eccentric abutments adjacent at least said posts of one polarity and opposing eccentric projections on the underside of said cover adjacent at least the apertures on one side of said center line for preventing said posts of said one polarity from extending fully through said apertures when said cover is mis-oriented with said indicia located adjacent said posts of unlike polarity.

2. The arrangement defined in claim 1 wherein said projections are only on one side of said center line so that said cover tilts when it is mis-oriented on said posts.

3. The arrangement defined in claim 1 wherein said abutments are formed integrally with said posts and said projections are formed integrally with said cover.

4. The arrangement defined in claim 3 wherein said abutments are in the form of shoulders which extend radially outward from said posts and said projections are diametrically opposed thereto when said cover is properly oriented.

5. The arrangement defined in claim 1 wherein said apertures each include a lead bushing coaxially surrounding each of said posts and said projections are formed integrally with said cover.

* * * * *